United States Patent
Goel et al.

(10) Patent No.: US 9,021,352 B2
(45) Date of Patent: Apr. 28, 2015

(54) METHODS AND APPARATUS FOR PREDICTIVE DOCUMENT RENDERING

(75) Inventors: Paresh Goel, Izzatnagar Bareilly (IN); Ayusman Sarangi, Orissa (IN); Pankaj Gupta, Noida (IN); Anup, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1618 days.

(21) Appl. No.: 11/750,150

(22) Filed: May 17, 2007

(65) Prior Publication Data

US 2008/0288729 A1 Nov. 20, 2008

(51) Int. Cl.
*G06F 17/00* (2006.01)
*G06F 17/21* (2006.01)
*G06F 12/08* (2006.01)

(52) U.S. Cl.
CPC ............ *G06F 17/21* (2013.01); *G06F 12/0862* (2013.01)

(58) Field of Classification Search
CPC .................................................. G06Q 30/0256
USPC ........................... 715/200, 255, 277, 204, 273
See application file for complete search history.

(56) References Cited

U.S. PATENT DOCUMENTS

| | | | | |
|---|---|---|---|---|
| 5,724,567 A * | 3/1998 | Rose et al. | ............. | 707/999.002 |
| 5,737,599 A * | 4/1998 | Rowe et al. | ..................... | 707/10 |
| 5,737,619 A * | 4/1998 | Judson | ........................... | 715/236 |
| 5,781,785 A * | 7/1998 | Rowe et al. | .................... | 715/234 |
| 5,819,301 A * | 10/1998 | Rowe et al. | .................... | 715/235 |
| 5,835,087 A * | 11/1998 | Herz et al. | ...................... | 715/810 |
| 6,098,102 A * | 8/2000 | Nielsen et al. | ................ | 709/229 |
| 6,128,712 A | 10/2000 | Hunt et al. | | |
| 6,202,058 B1 * | 3/2001 | Rose et al. | ...................... | 706/45 |
| 6,279,017 B1 * | 8/2001 | Walker | .......................... | 715/201 |
| 6,442,658 B1 | 8/2002 | Hunt et al. | | |
| 6,486,895 B1 * | 11/2002 | Robertson et al. | ............ | 715/776 |
| 6,721,780 B1 * | 4/2004 | Kasriel et al. | ................. | 709/203 |
| 7,103,594 B1 * | 9/2006 | Wolfe | .......................... | 707/706 |
| 7,296,222 B1 * | 11/2007 | Sakairi | ........................ | 715/234 |
| 7,669,119 B1 * | 2/2010 | Orelind et al. | ................ | 715/234 |
| 8,069,406 B2 * | 11/2011 | Weiss et al. | ................... | 715/208 |
| 8,538,989 B1 * | 9/2013 | Datar et al. | ................... | 707/780 |
| 8,566,696 B1 * | 10/2013 | Hamon et al. | ................. | 715/205 |
| 2002/0107884 A1 * | 8/2002 | Banerjee et al. | ........... | 707/501.1 |
| 2002/0165925 A1 * | 11/2002 | Hamilton et al. | ............ | 709/213 |

* cited by examiner

*Primary Examiner* — Manglesh M Patel
(74) *Attorney, Agent, or Firm* — Kilpatrick Townsend & Stockton LLP (57) ABSTRACT

A system receives a document having a predefined format to be rendered on the computer system. The document is comprised of a plurality of objects. The system identifies at least one correlation between at least two objects within the plurality of objects, and assigns a weight to the correlation. The system determines a logical relationship between at least two objects within the plurality of objects. The logical relationship is determined according to the weight of at least one correlation. The logical relationship is associated with an order in which at least one object is rendered on the computer system.

17 Claims, 8 Drawing Sheets

215 IDENTIFY AT LEAST ONE CORRELATION BETWEEN AT LEAST TWO OBJECTS WITHIN THE PLURALITY OF OBJECTS

216 IDENTIFY AT LEAST ONE CRITERIA BY WHICH TO IDENTIFY THE AT LEAST ONE CORRELATION BETWEEN AT LEAST TWO OBJECTS WITHIN THE PLURALITY OF OBJECTS

OR

217 CREATE A VISUAL REPRESENTATION IDENTIFYING THE AT LEAST ONE CORRELATION BETWEEN AT LEAST TWO OBJECTS WITHIN THE PLURALITY OF OBJECTS

↓

218 FOR EACH OF THE AT LEAST ONE CORRELATION IN THE VISUAL REPRESENTATION, DETERMINE A RANKING ASSOCIATED WITH THE AT LEAST ONE CORRELATION WITH RESPECT TO ANOTHER CORRELATION WITHIN THE VISUAL REPRESENTATION

↓

219 ARRANGE THE AT LEAST TWO OBJECTS WITHIN THE VISUAL REPRESENTATION ACCORDING TO THE RANKING

↓

220 IDENTIFY AT LEAST ONE PARENT CHILD RELATIONSHIP WITHIN THE VISUAL REPRESENTATION, BASED ON THE RANKING, THE PARENT CHILD RELATIONSHIP ASSOCIATED WITH THE AT LEAST ONE CORRELATION BETWEEN THE AT LEAST TWO OBJECTS WITHIN THE PLURALITY OF OBJECTS

↓

221 MODIFY THE RANKING OF AT LEAST ONE OBJECT IDENTIFIED AS THE CHILD OBJECT WITHIN THE PARENT CHILD RELATIONSHIP BASED ON THE RANKING ASSOCIATED WITH THE PARENT OBJECT WITHIN THE PARENT CHILD RELATIONSHIP

METHODS AND APPARATUS FOR PREDICTIVE DOCUMENT RENDERING

BACKGROUND

Conventional computerized devices, such as personal computers, laptop computers, and the like enable users to access (i.e., download) documents. Documents can be stored locally (i.e., on the hard drive of the a computer), or remotely, such as on a server. A server can be a local area network, available only to a particular group of users. A server can also be a publicly available server, such as the Internet.

A portable document is a document that is self-contained, and portable across any platform. That is, everything (i.e., document structures, etc.) needed to view the document (i.e., fonts, images, etc.) is bundled into the document. All users will see the same document even when viewed with different computers, different operating systems, different document viewers, etc. Essentially, the document appears the same on virtually any viewer or printed out on paper. A document that is in Portable Document Format (PDF) is an example of a portable document.

When a user accesses a document residing on a server, typically a copy of that document is downloaded from the server to a cache on the user's computer. The time necessary for the download to occur can depend on a number of different factors, such as the connection speed of the user's computer, the bandwidth of the server, the number of pages in the document, etc.

Many portable documents may contain large number of pages. When an application viewer documents loads a document, usually only the next subsequent page is pre-loaded (i.e., cached) by the application viewer. If a user jumps to any other logically related page (for example, a user views page 2 and clicks on a link in page 2 to jump to page 8), the application viewer has to download that page at that instant. This may take a considerable amount of time, during which the user must wait for the page to load within the application viewer.

SUMMARY

Conventional technologies for downloading portable documents, suffer from a variety of deficiencies. In particular, conventional technologies related to downloading portable documents are limited in that conventional technologies assume a user will view the pages of a portable document in a sequential manner (i.e., assuming the user will view the first page, then the second page, then the third page, etc.). Conventional technologies download the pages of a portable document in a pre-determined order according to the sequence of the pages. Therefore, when a user chooses to view a page that is not sequential to the page the application viewer is currently displaying (for example, viewing page 3, then clicking a link within page 3 to view page 11), conventional technologies download the portable document pages as they are needed (meaning conventional technologies download pages 4 through 10 before downloading page 11). This requires a user to wait until the application viewer has completed downloading the page. Users are left frustrated when attempting to download a page to view and the application viewer does not respond in a timely manner.

Embodiments disclosed herein significantly overcome such deficiencies and provide a system that includes a computer system executing a predictive document rendering process that predicts the next logically related page in a portable document. Thus, delays in downloading a non sequential page (for example, as selected by a user) is eliminated, or at the very least, reduced. The predictive document rendering process receives a portable document that is comprised of a plurality of objects (i.e., the pages of the portable document) to be rendered on a computer system. In other words, a user selects a page of the portable document to display within an application viewer. The predictive document rendering process identifies correlations between the pages of the portable document using criteria. Criteria may include, but are not limited to attributes associated with a page, actions a user performs when a page is rendered, etc. The predictive document rendering process assigns a weight to each correlation and then determines a logical relationship between the pages of the portable document. The logical relationship determines a predictive sequence in which the predictive document rendering process anticipates a user will render the pages of the portable document. The mechanism to store the caching/preloading order, as determined by the importance criteria, can be implemented in various ways. For example, for a PDF document at the time of generation of the PDF document, the linearization order of the PDF document will be written in accordance with the importance of the pages.

The predictive document rendering process creates a visual representation, such as a graph, of the correlations between the objects of the portable document. For each correlation, the predictive document rendering process determines a rank of the correlation with respect to another correlation within the visual representation. For example, if page 1 has a link to page 8, page 10 and page 12 of the portable document, the predictive document rendering process creates a visual representation between pages 1, 8, 10 and 12. Since page 8, page 10 and page 12 are directly linked to page 1, these pages have a higher rank (with respect to a logical relationship between these pages, and page 1) than a page, for example, page 9, that is indirectly linked to page 1 via a link to page 8. The ranking may indicate an importance associated with the correlations between objects. The importance may be associated with an assessment of the importance that the predictive document rendering process anticipates a user will assign to various objects within the portable document.

The predictive document rendering process traverses the plurality of correlations to determine the logical relationships between the objects (for example, pages) in the portable document, based on the weight assigned to each correlation.

In an example embodiment, a user (during a previous interaction with the portable document) interacts with a page of the portable document (i.e., such as clicking on a link within a page, remaining on the page for a predetermined amount of time, etc.). The predictive document rendering process takes into account the previous actions of the user when performing the process of determining the next logical page to render on the computer system based on the (previous) interactions between the page of the portable document and the user.

In another example embodiment, the predictive document rendering process provides a graphical user interface in which a user can specify the logical relationship between the pages of the portable document. The predictive document rendering process determines a predictive sequence in which the predictive document rendering process anticipates a user will render the pages of the portable document. In another example embodiment, the user may specify the actual sequence of the pages.

The predictive document rendering process receives a document (comprising a plurality of objects), having a pre-defined format, to be rendered on a computer system. The predictive document rendering process identifies at least one correlation between at least two objects within the plurality of objects, and assigns a weight to the at least one correlation. The predictive document rendering process determines a logical relationship between at least two objects within the plurality of objects. The logical relationship is determined according to the weight of at least one correlation. The logical relationship is associated with an order in which at least one object is rendered on the computer system.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

It is to be understood that the system disclosed herein may be embodied strictly as a software program, as software and hardware, or as hardware alone. The embodiments disclosed herein, may be employed in data communications devices and other computerized devices and software systems for such devices such as those manufactured by Adobe Systems Incorporated of San Jose, Calif.

BRIEF DESCRIPTION OF THE DRAWINGS

The foregoing will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

Embodiments disclosed herein include a computer system executing a predictive document rendering process that receives a document (comprising a plurality of objects), having a predefined format, to be rendered on a computer system. The predictive document rendering process identifies at least one correlation between at least two objects within the plurality of objects, and assigns a weight to the at least one correlation. The predictive document rendering process determines a logical relationship between at least two objects within the plurality of objects. The logical relationship is determined according to the weight of at least one correlation. The logical relationship is associated with an order in which at least one object is rendered on the computer system.

The predictive document rendering process receives a portable document that is comprised of a plurality of objects (i.e., the pages of the portable document) to be rendered on a computer system. In other words, a user selects a page of the portable document to display within an application viewer. The predictive document rendering process identifies correlations between the pages of the portable document using criteria. Criteria may include, but are not limited to attributes associated with a page, actions a user performs when a page is rendered, etc. The predictive document rendering process assigns a weight to each correlation and then determines a logical relationship between the pages of the portable document. The logical relationship determines a predictive sequence in which the predictive document rendering process anticipates a user will render the pages of the portable document.

Figure 1:
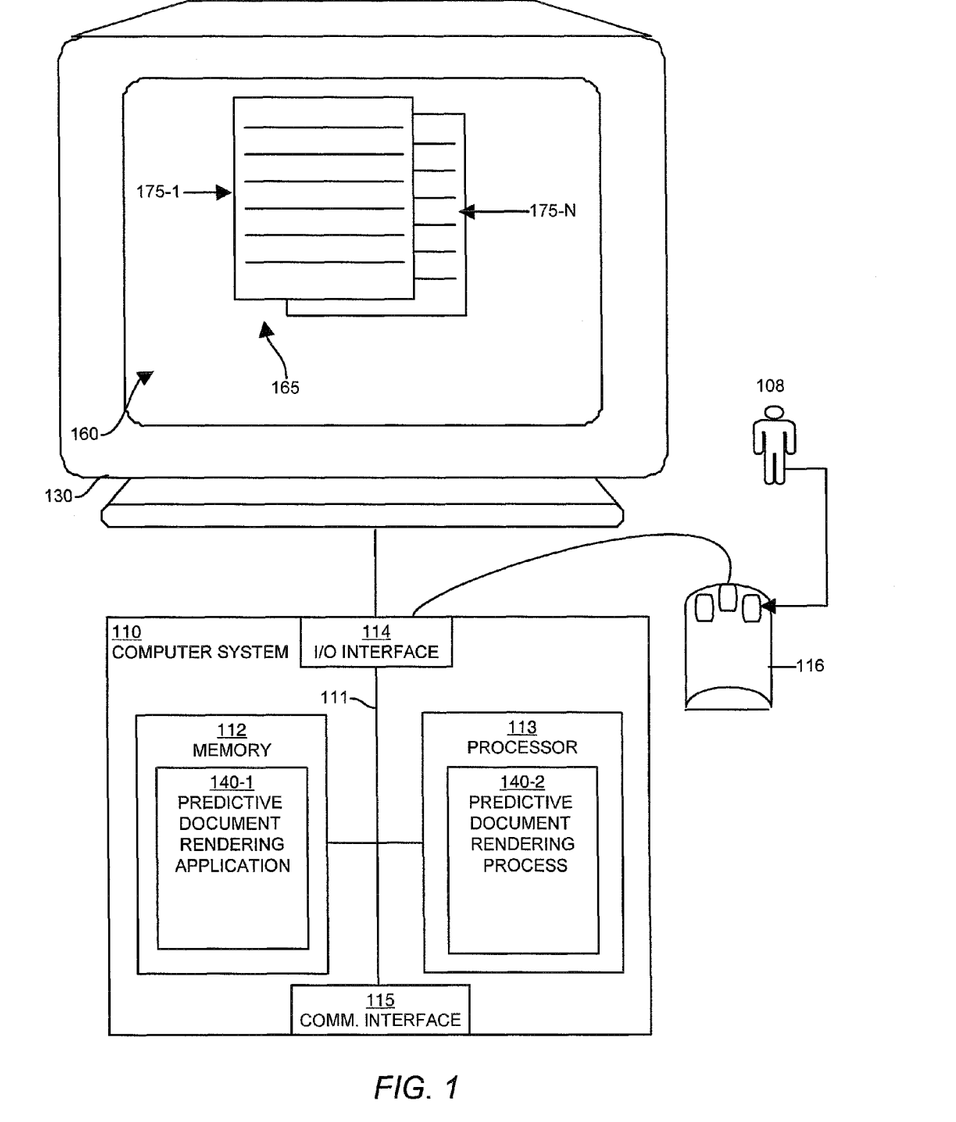
FIG. 1 shows a high level view of a document editor according to one embodiment disclosed herein.

FIG. 1 is a block diagram illustrating example architecture of a computer system 110 that executes, runs, interprets, operates or otherwise performs a predictive document rendering application 140-1 and predictive document rendering process 140-2 suitable for use in explaining example configurations disclosed herein. The computer system 110 may be any type of computerized device such as a personal computer, workstation, portable computing device, console, laptop, network terminal or the like. An input device 116 (e.g., one or more user/developer controlled devices such as a keyboard, mouse, etc.) couples to processor 113 through I/O interface 114, and enables a user 108 to provide input commands, and generally control the graphical user interface 160 that the predictive document rendering application 140-1 and process 140-2 provides on the display 130. The graphical user interface 160 displays a portable document 165 comprised of a plurality of objects 175-N (i.e., the pages of the portable document 165). As shown in this example, the computer system 110 includes an interconnection mechanism 111 such as a data bus or other circuitry that couples a memory system 112, a processor 113, an input/output interface 114, and a communications interface 1 15. The communications interface 115 enables the computer system 110 to communicate with other devices (i.e., other computers) on a network (not shown).

The memory system 112 is any type of computer readable medium, and in this example, is encoded with a predictive document rendering application 140-1 as explained herein. The predictive document rendering application 140-1 may be embodied as software code such as data and/or logic instructions (e.g., code stored in the memory or on another computer readable medium such as a removable disk) that supports processing functionality according to different embodiments described herein. During operation of the computer system 110, the processor 113 accesses the memory system 112 via the interconnect 111 in order to launch, run, execute, interpret or otherwise perform the logic instructions of the predictive document rendering application 140-1. Execution of the predictive document rendering application 140-1 in this manner produces processing functionality in a predictive document rendering process 140-2. In other words, the predictive document rendering process 140-2 represents one or more portions or runtime instances of the predictive document rendering application 140-1 (or the entire predictive document rendering application 140-1) performing or executing within or upon the processor 113 in the computerized device 110 at runtime.

It is noted that example configurations disclosed herein include the predictive document rendering application 140-1 itself (i.e., in the form of un-executed or non-performing logic instructions and/or data). The predictive document rendering application 140-1 may be stored on a computer readable medium (such as a floppy disk), hard disk, electronic, magnetic, optical, or other computer readable medium. The predictive document rendering application 140-1 may also be stored in a memory system 112 such as in firmware, read only memory (ROM), or, as in this example, as executable code in, for example, Random Access Memory (RAM). In addition to these embodiments, it should also be noted that other embodiments herein include the execution of the predictive document rendering application 140-1 in the processor 113 as the predictive document rendering process 140-2. Those skilled in the art will understand that the computer system 110 may include other processes and/or software and hardware components, such as an operating system not shown in this example.

A display 130 need not be coupled directly to computer system 110. For example, the predictive document rendering application 140-1 can be executed on a remotely accessible computerized device via the network interface 115. In this instance, the graphical user interface 160 may be displayed locally to a user 108 of the remote computer, and execution of the processing herein may be client-server based.

Figure 2:
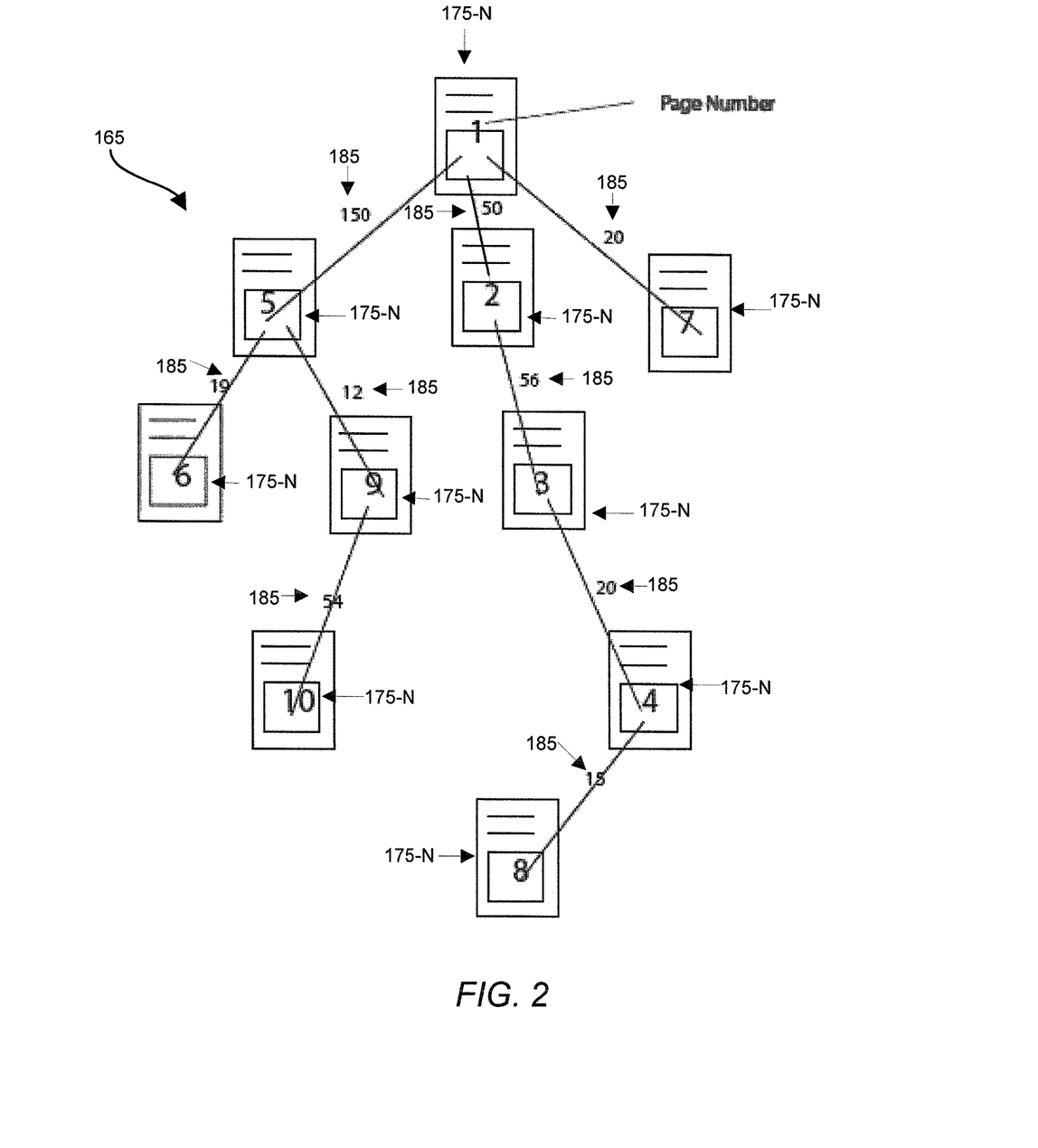
FIG. 2 illustrates an example visual representation of identifying at least one correlation between the objects within a portable document, according to one embodiment disclosed herein.

FIG. 2 is an example visual representation identifying correlations between objects 175-N within the portable document 165. The predictive document rendering process 140-2 assigns a weight 185 to each correlation between at least two objects 175-N within the portable document 165. In this example, objects 175-N (i.e., the pages of the portable document 165) are placed in a graph where links represent correlations between objects 175-N (i.e., the pages of the portable document 165). These correlations have weights 185 determined by various factors. In this graph, page 1 is linked to pages 5, 2, and 7. Page 5 is linked to pages 6 and 9, and page 9 is linked to page 10. Page 2 is linked to page 3. Page 3 is linked to page 4. Page 4, in turn, is linked to page 8.

Further details of configurations explained herein will now be provided with respect to a flow chart of processing steps that show the high level operations disclosed herein to perform the predictive document rendering process 140-2.

Figure 3:
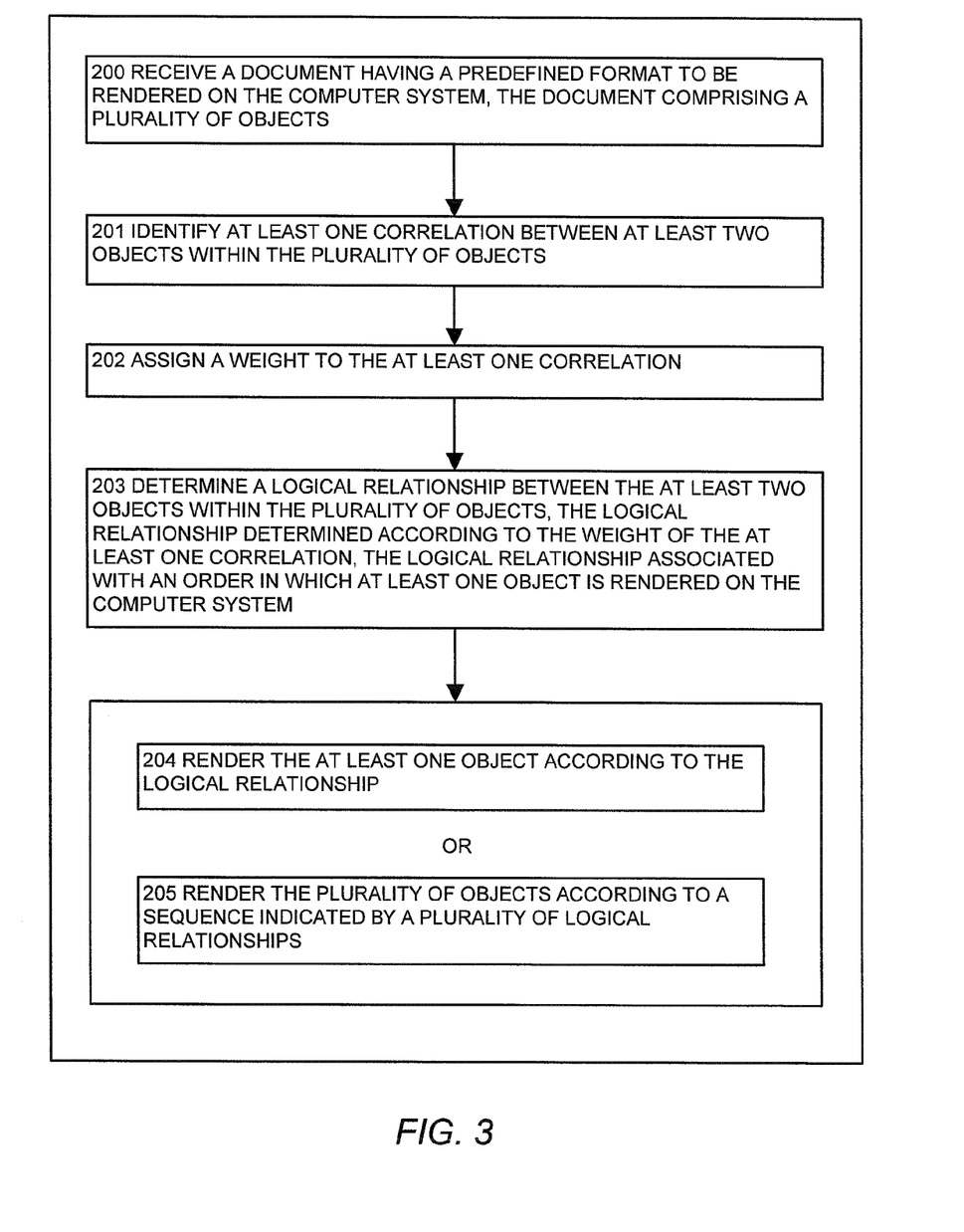
FIG. 3 illustrates a flowchart of a procedure performed by the system of FIG. 1, when the predictive document rendering process receives a document having a predefined format to be rendered on the computer system, the document comprising a plurality of objects, according to one embodiment disclosed herein.

FIG. 3 is an embodiment of the steps performed by the predictive document rendering process 140-2 when it receives a portable document 165 having a predefined format to be rendered on the computer system 110.

In step 200, the predictive document rendering process 140-2 receives a portable document 165 having a predefined format to be rendered on the computer system 110. The portable document 165 is comprised of a plurality of objects 175-N (i.e., the pages of the portable document 165). For example, the predictive document rendering process 140-2 may receive the portable document 165 because a user 108 performs an action to invoke the portable document 165 within an application viewer.

In step 201, the predictive document rendering process 140-2 identifies at least one correlation between at least two objects 175-N within the plurality of objects 175-N. Objects 175-N (i.e., pages) within a portable document 165 may contain correlations between the objects 175-N in a variety of ways, such as sequential objects 175-N (i.e., sequential pages), links within the objects 175-N that link to another non sequential objects 175-N within the portable document 165, etc.

In step 202, the predictive document rendering process 140-2 assigns a weight 185 to at least one correlation. In an example embodiment, the predictive document rendering process 140-2 assigns a weight 185 to each of the correlations identified within the portable document 165. The weight 185 indicates an importance of the correlation between two objects 175-N as compared to the other correlations between any other two objects 175-N within the portable document 165. FIG. 2 illustrates example weights 185 assigned to each correlation between the objects 175-N within the portable document 165.

In step 203, the predictive document rendering process 140-2 determines a logical relationship between at least two objects 175-N within the plurality of objects 175-N. The logical relationship is determined according to the weight 185 of at least one correlation. The logical relationship is associated with an order in which at least one object 175-1 is rendered on the computer system 110. In other words, the predictive document rendering process 140-2 utilizes the weights 185 to determine the logical relationship between the objects 175-N within the portable document 165. That logical relationship is used to determine an order in which the predictive document rendering process 140-2 anticipates the user 108 will view the objects 175-N (i.e., pages) of the portable document 165.

In step 204, the predictive document rendering process 140-2 renders at least one object 175-1 according to the logical relationship. In an example embodiment, a user 108 has invoked the portable document 165 within an application viewer, and is viewing an object 175-1 (i.e., a page) within the portable document 165. Based on the object 175-1 (i.e., page 3) currently viewed by the user 108, the predictive document rendering process 140-2 renders an object 175-N (i.e., page 11) according to the logical relationship between the object 175-1 (i.e., page 3) currently viewed by the user 108, and the object 175-N (i.e., page 11) that the predictive document rendering process 140-2 anticipates is the next logical page that the user 108 will view.

Alternatively, in step 205, the predictive document rendering process 140-2 renders the plurality of objects 175-N according to a sequence indicated by a plurality of logical relationships. In an example embodiment, the predictive document rendering process 140-2 determines the logical relationships of all the objects 175-N (i.e., the pages of the portable document 165), and renders the plurality of objects 175-N according to those logical relationships. Thus, when a user 108, for example, selects a link (linking page 1 with page 7) within the portable document 165 on page 1, the predictive document rendering process 140-2 renders the anticipated page (i.e., page 7) based on the logical relationship determined between page 1 and page 7. Thus, the user 108 does not have to wait for pages 2 through 7 to download within the application viewer.

Figure 4:
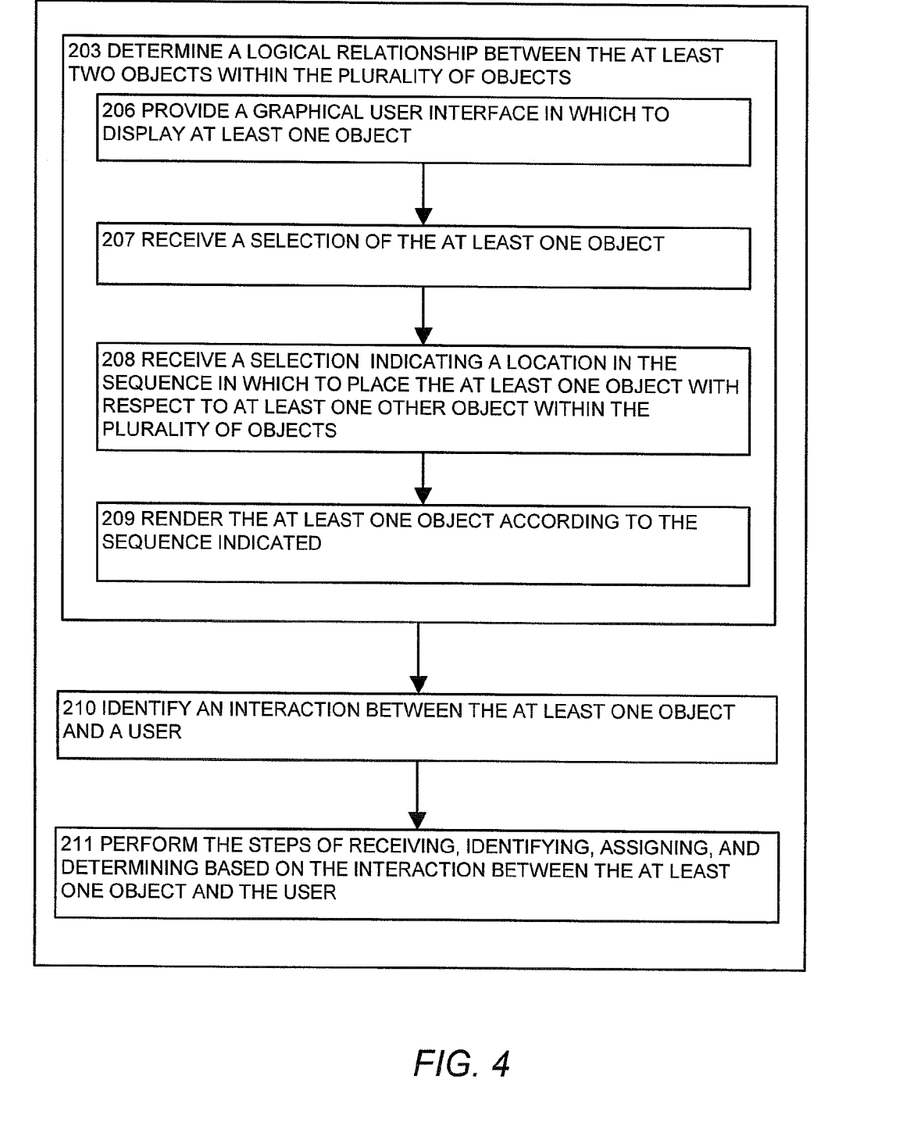
FIG. 4 illustrates a flowchart of a procedure performed by the system of FIG. 1, when the predictive document rendering process renders the plurality of objects according to a sequence indicated by a plurality of logical relationships, according to one embodiment disclosed herein.

FIG. 4 is continuation of FIG. 3, and is an embodiment of the steps performed by the predictive document rendering process 140-2 when it determines a logical relationship between at least two objects 175-N within the plurality of objects 175-N.

In step 206, the predictive document rendering process 140-2 provides a graphical user interface 160 in which to display at least one object 175-N. In an example embodiment, the predictive document rendering process 140-2 allows a user 108 to participate in the process of determining the logical relationships between the objects 175-N within the portable document 165. The predictive document rendering process 140-2 provides a graphical user interface 160 in which one or more objects 175-N (i.e., the pages of the portable document 165) are displayed. In an example embodiment, graphical icons represent each of the objects 175-N within the portable document 165. The presentation of the objects 175-N within a graphical user interface 160 allows the user 108 to provide input to determine the sequence of the objects 175-N.

In step 207, the predictive document rendering process 140-2 receives a selection of at least one object 175-1. Within the graphical user interface 160, the user 108 selects an object 175-1 (or, a graphical icon representing that object 175-1). In other words, the graphical user interface 160 displays graphical icons representing the objects 175-N within the portable document 165, and the user 108 selects one (or more) of the objects 175-N, for example, using an input device 116.

In step 208, the predictive document rendering process 140-2 receives a selection indicating a location in the sequence in which to place at least one object 175-1 with respect to at least one other object 175-N within the plurality of objects 175-N. In other words, within the graphical user interface 160, the user 108 may graphically manipulate the location of the objects 175-N (or graphical icons representing the objects 175-N) to indicate a sequence that represents the logical relationships between the objects 175-N (i.e., the pages of the portable document 165).

In step 209, the predictive document rendering process 140-2 renders at least one object 175-1 according to the sequence indicated. In other words, upon invoking a portable document 165 within an application viewer, the predictive document rendering process 140-2 may perform a series of actions to determine the logical relationships between the objects 175-N of the portable document 165. However, the predictive document rendering process 140-2 also provides the capability for a user 108 to specify the logical relationships between the objects 175-N of the portable document 165. In either scenario, the predictive document rendering process 140-2 renders the objects 175-N (i.e., the pages of the portable document 165) within the application viewer according to the determined logical relationships.

In step 210, the predictive document rendering process 140-2 identifies an interaction between at least one object 175-1 and a user 108. For example, a user 108 views an object 175-1 (i.e., a page of the portable document 165) within an application viewer. The user selects a link within the object 175-1 (i.e., the pages of the portable document 165). In an example embodiment, the user 108 opens a portable document 165 and views an object 175-1 (i.e., a page of the portable document 165), and remains viewing that object 175-1 (i.e., the page of the portable document 165) beyond the threshold of a predetermined amount of time. The predictive document rendering process 140-2 assumes the user 108 is reading the content of the object 175-1 (i.e., the page of the portable document 165), and identifies this as an interaction between the object 175-1 (i.e., the page of the portable document 165) and the user 108.

In step 211, the predictive document rendering process 140-2 performs the steps of receiving, identifying, assigning, and determining based on a previous interaction between at least one object 175-1 and the user 108. In other words, before a user views a portable document 165, the predictive document rendering process 140-2 performs steps to determine the logical relationships between the objects 175-N of the portable document 165. Once a user 108 is viewing the object 175-1 within the portable document 165, the predictive document rendering process 140-2 identifies interactions between the user 108 and at least one object 175-1 (i.e., a page of the portable document 165). When the user 108 opens the portable document 165, the predictive document rendering process 140-2 performs steps to determine the logical relationships between the objects 175-N of the portable document 165, based on the previous interactions between the user 108 and the portable document 165. Thus, if the predictive document rendering process 140-2 anticipates that a user 108 will select a link on page 1 to go to page 8, and instead, the user views page 1 beyond the threshold of a predetermined amount of time, the predictive document rendering process 140-2 may anticipate that the logical relationship between page 1 and page 2 (i.e., the next sequential page) is of higher weight 185 than the logical relationship between page 1 and page 8.

Figure 5:
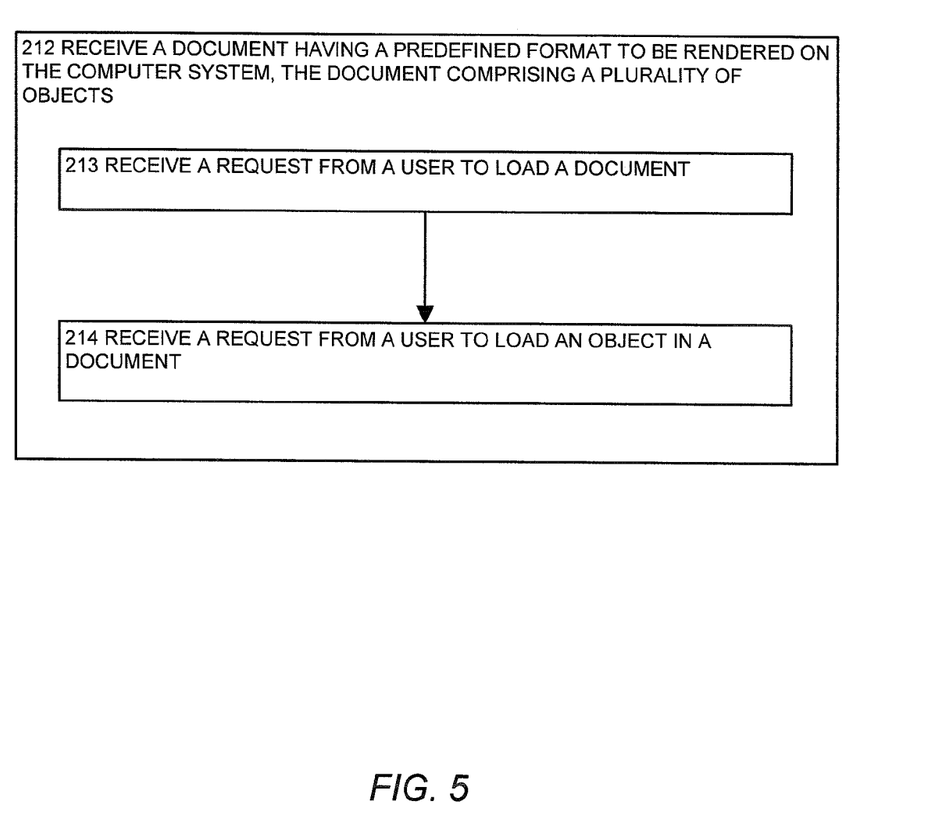
FIG. 5 illustrates a flowchart of a procedure performed by the system of FIG. 1, when the predictive document rendering process receives a document having a predefined format to be rendered on the computer system, and receives a request from a user, according to one embodiment disclosed herein.

FIG. 5 is an embodiment of the steps performed by the predictive document rendering process 140-2 when it receives a portable document 165 having a predefined format to be rendered on the computer system 110.

In step 212, the predictive document rendering process 140-2 receives a portable document 165 having a predefined format to be rendered on the computer system 110. The portable document 165 is comprised of a plurality of objects 175-N. For example, the predictive document rendering process 140-2 may receive the portable document 165 because a user 108 invokes a portable document 165 within a web browser. Or, the predictive document rendering process 140-2 may receive the portable document 165 because a user 108 interacted with a portable document 165 (i.e., viewed a page, clicked on a link, clicked on a bookmark, etc.) In step 213, the predictive document rendering process 140-2 receives a request from a user 108 to load a portable document 165. In an example embodiment, the steps to determine the logical relationships between the objects 175-N of the portable document 165 may be performed by the predictive document rendering process 140-2 when a user 108 invokes the portable document 165 within an application viewer (i.e., 'opens' the portable document 165).

In step 214, the predictive document rendering process 140-2 receives a request from a user 108 to load an object 175-1 in a portable document 165. In an example embodiment, the steps to determine the logical relationships between the objects 175-N of the portable document 165 may be performed by the predictive document rendering process 140-2 when a user 108 invokes an object 175-1 within a portable document 165. For example, the user 108 may select a link within a object 175-1 (i.e., the pages of the portable document 165).

Figure 6:
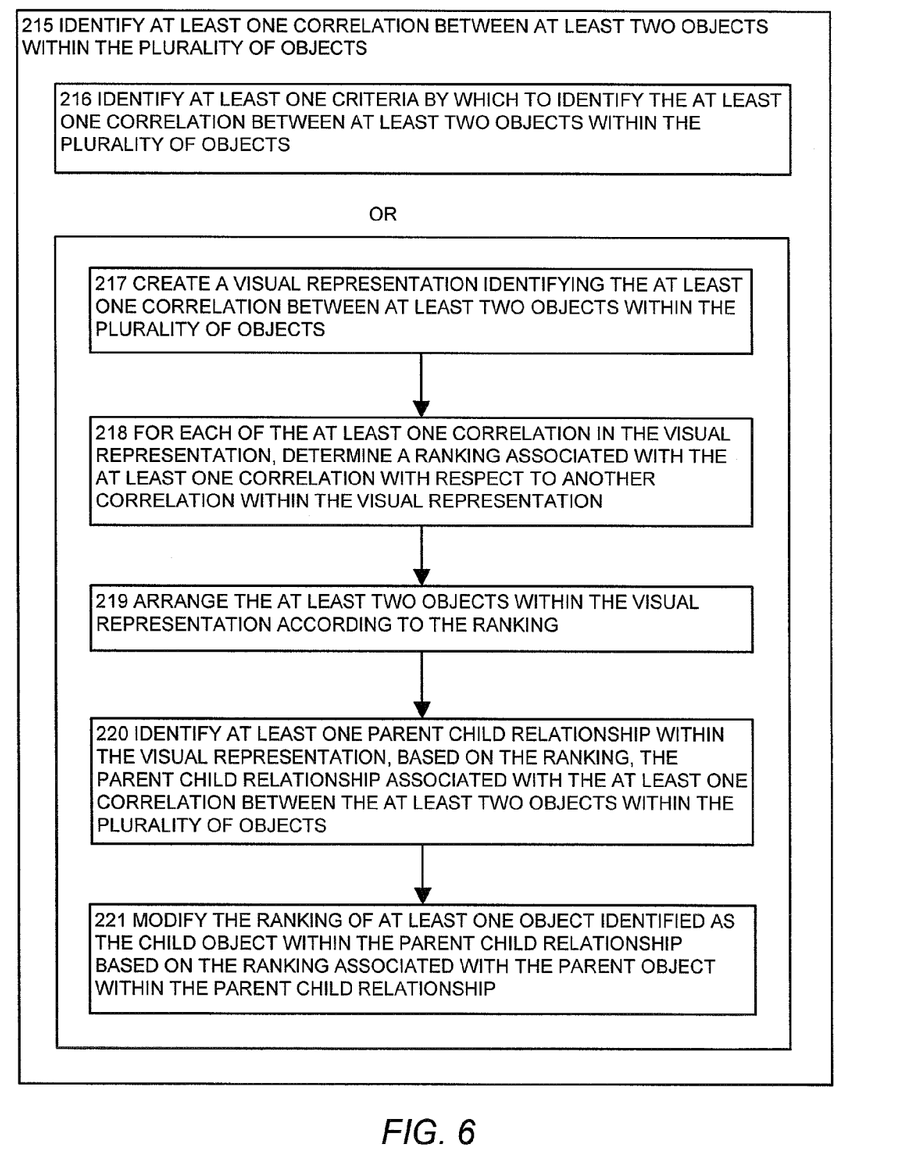
FIG. 6 illustrates a flowchart of a procedure performed by the system of FIG. 1, when the predictive document rendering process assigns a weight to at least one correlation, according to one embodiment disclosed herein.

FIG. 6 is an embodiment of the steps performed by the predictive document rendering process 140-2 when it identifies at least one correlation between at least two objects 175-N within the plurality of objects 175-N.

In step 215, the predictive document rendering process 140-2 identifies at least one correlation between at least two objects 175-N within the plurality of objects 175-N. Objects 175-N (i.e., pages) within a portable document 165 may contain correlations between the objects 175-N in a number of ways, such as sequential objects 175-N (i.e., sequential pages), links within the objects 175-N that link to another non sequential objects 175-N within the portable document 165, etc.

In step 216, the predictive document rendering process 140-2 identifies at least one criteria by which to identify at least one correlation between at least two objects 175-N within the plurality of objects 175-N. The criteria may include, but is not limited to:
  i) links between objects 175-N (i.e., the pages of the portable document 165) within the portable document 165,
  ii) threaded text within the portable document 165,
  iii) the next sequential object 175-1 (i.e., the next page within the portable document 165),
  iv) a bookmark within the portable document 165,
  v) comments on the pages within the portable document 165,
  vi) font size of text on an object 175-1 (i.e., the pages of the portable document 165),
  vii) formatting of text on an object 175-1 (i.e., the pages of the portable document 165),
  viii) an importance a user 108 associates with a given criteria,
  ix) the presence of multimedia on the object 175-1 (i.e., the pages of the portable document 165),
  x) the most viewed object 175-1 (i.e., the pages of the portable document 165),
  xi) a user 108 highlighting text within an object 175-1 (i.e., the pages of the portable document 165), and
  xii) measured time a user 108 has spent on the object 175-1 (i.e., the pages of the portable document 165).

Alternatively, in step 217, the predictive document rendering process 140-2 creates a visual representation identifying at least one correlation between at least two objects 175-N within the plurality of objects 175-N. FIG. 2 illustrates an example of a visual representation. In this example, objects 175-N (i.e., the pages of the portable document 165) are placed in a graph where links represent correlations between objects 175-N (i.e., the pages of the portable document 165). These correlations have weights 185 determined by various factors. In this graph, page 1 is linked to pages 5, 2, and 7. Page 5 is linked to pages 6 and 9, and page 9 is linked to page 10. Page 2 is linked to page 3. Page 3 is linked to page 4. Page 4, in turn, is linked to page 8. FIG. 2 illustrates one example visual representation. In an example embodiment, the visual representation may also depict a circular graph.

For each of the correlations in the visual representation, in step 218, the predictive document rendering process 140-2 determines a ranking associated with at least one correlation with respect to another correlation within the visual representation. FIG. 2 illustrates this ranking as depicted by the weights 185 associated with each correlation (between the objects 175-N) within the graph.

In step 219, the predictive document rendering process 140-2 arranges at least two objects 175-N within the visual representation according to the ranking. In an example embodiment, the predictive document rendering process 140-2 assigns the objects 175-N to a tier (i.e., a $1^{st}$ tier, $2^{nd}$ tier, $3^{rd}$ tier, etc). The predictive document rendering process 140-2 then arranges the objects 175-N within the visual representation according to these tiers. In FIG. 2, page 5, page 2 and page 7 are arranged in the $1^{st}$ tier. Page 6, page 9 and page 3 are arranged in the $2^{nd}$ tier. Page 10 and page 4 are arranged in a $3^{rd}$ tier, and page 8 is arranged in a $4^{th}$ tier.

In step 220, the predictive document rendering process 140-2 identifies at least one parent child relationship within the visual representation, based on the ranking. The parent child relationship is associated with at least one correlation between at least two objects 175-N within the plurality of objects 175-N. In FIG. 2, the relationship between page 1 and page 5 is a parent child relationship where page 1 is the parent and page 5 is the child.

In step 221, the predictive document rendering process 140-2 modifies the ranking of at least one object 175-1 identified as the child object within the parent child relationship based on the ranking associated with the parent object within the parent child relationship. In other words, when determining the ranking of an object 175-N, if that object 175-N is the child object within a parent child object relationship, the ranking of the parent object may boost the ranking of the child object.

Figure 7:
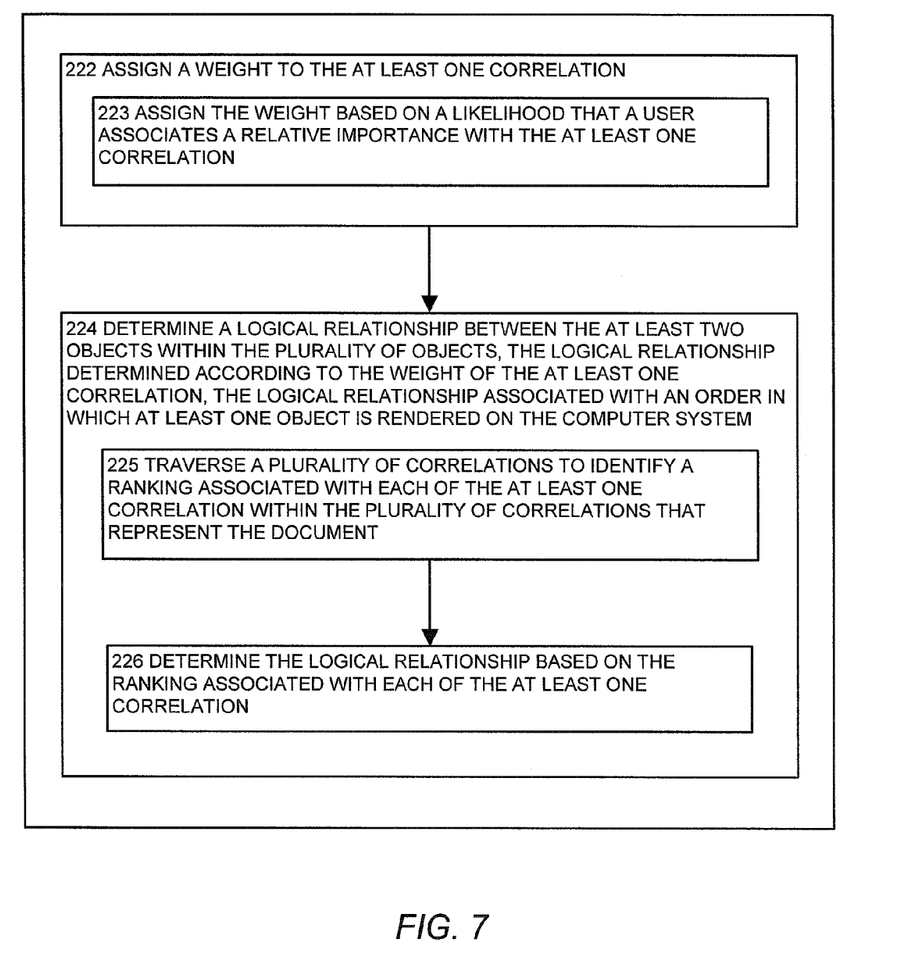
FIG. 7 illustrates a flowchart of a procedure performed by the system of FIG. 1, when the predictive document rendering process assigns a weight to at least one correlation, according to one embodiment disclosed herein.

FIG. 7 is an embodiment of the steps performed by the predictive document rendering process 140-2 when it assigns a weight 185 to at least one correlation.

In step 222, the predictive document rendering process 140-2 assigns a weight 185 to at least one correlation. The weight 185 indicates an importance of the correlation between two objects 175-N as compared to the other correlations between any other two objects 175-N within the portable document 165. In an example embodiment, the predictive document rendering process 140-2 may also factor in whether one of the two objects 175-N is sequential to the other object 175-1. In other words, whether two pages within the portable document 165 are sequential in number. The weight 185 may also indicate a strength or weakness factor associated with the correlation between two objects 175-N.

In step 223, the predictive document rendering process 140-2 assigns the weight 185 based on a likelihood that a user 108 associates a relative importance with at least one correlation. When determining the logical relationships between objects 175-N (i.e., the pages of the portable document 165) in anticipation of serving up the next object 175-1 (i.e., a page of the portable document 165) that a user 108 is likely to request to view, the predictive document rendering process 140-2 also factors in the importance a user 108 associates with that object 175-1 (i.e., a page of the portable document 165).

In step 224, the predictive document rendering process 140-2 determines a logical relationship between at least two objects within the plurality of objects. The logical relationship is determined according to the weight of the at least one correlation. The logical relationship is associated with an order in which at least one object is rendered on the computer system 110.

In step 225, the predictive document rendering process 140-2 traverses a plurality of correlations to identify a ranking associated with each of the correlations within the plurality of correlations that represent the portable document 165. In an example embodiment, the predictive document rendering process 140-2 traverses the plurality of correlations breadth first, then depth. Using FIG. 2 as an example, the predictive document rendering process 140-2 traverses the graph in the order of page 1, page 5, page 7, page 6, page 9, page 3, page 10, page 4, and page 8. At each tier, the predictive document rendering process 140-2 selects the next logical object (i.e., page) based on the weight of that object to the object on a higher level. In other words, if page 5 is on the first tier, and has a logical relationship with page 6, and page 9 on the second tier, the predictive document rendering process 140-2 will select the next logical object 175-N (i.e., page) based on the weight 185 of the logical relationship between:

i) page 5 and page 6 (with a weight 185 of 19); and
ii) page 5 and page 9 (with a weight 185 of 12).

The page in the second tier that has the higher weight (with respect to the other page in the second tier) will be selected as the next logical page. Thus, since page 6 has a higher weight 185 with regard to page 5 than page 9, page 6 is the next logical page.

In step 226, the predictive document rendering process 140-2 determines the logical relationship based on the ranking associated with each of the correlations. The predictive document rendering process 140-2 traverses the plurality of correlations, and determines the logical relationships based on the rankings associated with the correlations between the objects 175-N within the portable document 165.

Figure 8:
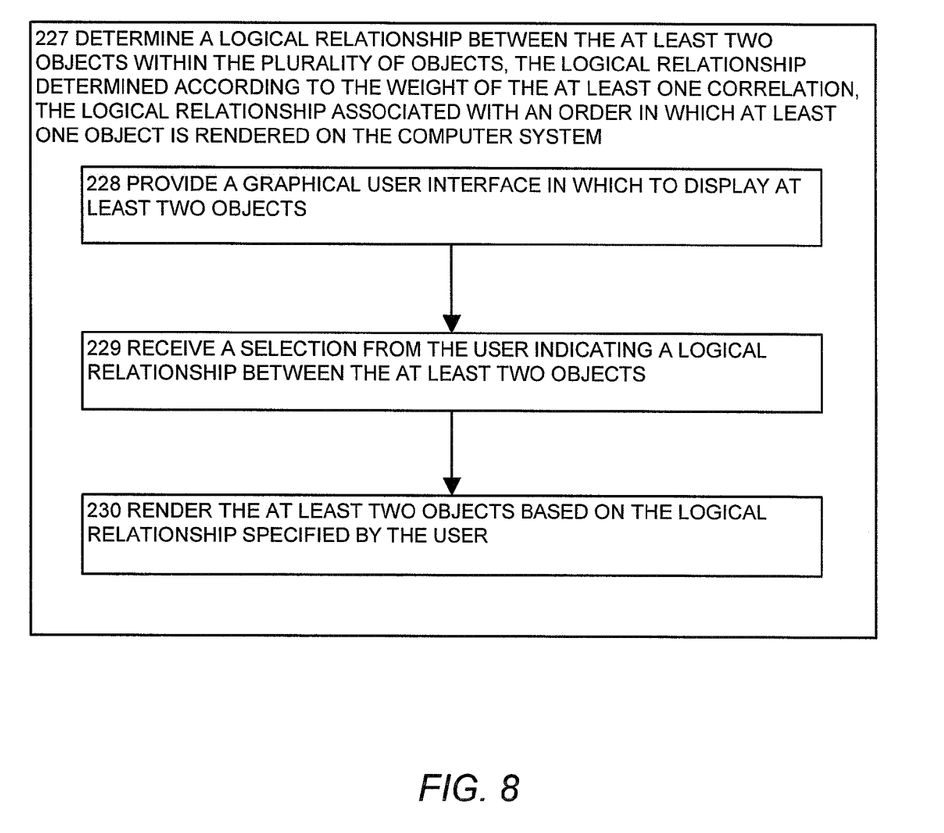
FIG. 8 illustrates a flowchart of a procedure performed by the system of FIG. 1, when the predictive document rendering process determines a logical relationship between at least two objects within the plurality of objects, according to one embodiment disclosed herein.

FIG. 8 is an embodiment of the steps performed by the predictive document rendering process 140-2 when it determines a logical relationship between at least two objects 175-N within the plurality of objects 175-N.

In step 227, the predictive document rendering process 140-2 determines a logical relationship between at least two objects 175-N within the plurality of objects 175-N. The logical relationship is determined according to the weight 185 of at least one correlation. The logical relationship is associated with an order in which at least one object 175-1 is rendered on the computer system 110.

In step 228, the predictive document rendering process 140-2 provides a graphical user interface 160 in which to display at least two objects 175-N. In an example embodiment, the predictive document rendering process 140-2 allows a user 108 to participate in the process of determining the logical relationships between the objects 175-N within the portable document 165. The predictive document rendering process 140-2 provides a graphical user interface 160 in which one or more objects 175-N (i.e., the pages of the portable document 165) are displayed. In an example embodiment, graphical icons represent each of the objects 175-N within the portable document 165. The presentation of the objects 175-N within a graphical user interface 160 allows the user 108 to provide input in determining the logical relationships between the objects 175-N.

In step 229, the predictive document rendering process 140-2 receives a selection from the user 108 indicating a logical relationship between at least two objects 175-N. In an example embodiment, the predictive document rendering process 140-2 renders at least two objects 175-N within the graphical user interface 160. The predictive document rendering process 140-2 allows a user 108 to specify the logical relationship between the two objects 175-N.

In step 230, the predictive document rendering process 140-2 renders at least two objects 175-N based on the logical relationship specified by the user 108. The user 108 specifies the logical relationships between the objects 175-N within the portable document 165, and the predictive document rendering process 140-2 renders the objects 175-N according to the logical relationships specified by the user 108. Thus, the user 108 may specify the order of the objects 175-N within the portable document 165, or the user 108 may simply specify the logical relationships between the objects 175-N of the portable document 165, and then the predictive document rendering process 140-2 determines the sequential order in which to render the objects 175-N within the application viewer.

While computer systems and methods have been particularly shown and described above with references to configurations thereof, it will be understood by those skilled in the art that various changes in form and details may be made therein without departing from the scope disclosed herein. Accordingly, the information disclosed herein is not intended to be limited by the example configurations provided above.

What is claimed is:

1. A computer-implemented method comprising:
receiving a page of a document having a predefined format to be rendered on the computer system, the document comprising a plurality of pages;
after receiving the page, identifying correlations between the page and each of a plurality of other pages of the document, the correlations identified based on multiple criteria comprising criteria regarding page links, page sequence, page attributes, page view history, or user-assigned importance;
assigning a weight to each correlation indicating a relative importance of the correlation between the page and the respective other page; and
determining an anticipated next page of the plurality of other pages according to the weights.

2. The method of claim 1, wherein
the anticipated next page is determined from a logical sequence of pages including the page and the at least one other page, the logical sequence different from a sequential order of the pages.

3. The method of claim 1, wherein at least one correlation is identified and the weight is assigned based on input identifying an interaction between at least one object in the page and a user.

4. The method of claim 1, wherein assigning a weight to each correlation comprises:
assigning the weight based on a likelihood that a user associates a relative importance with the at least one correlation.

5. The method of claim 1, wherein identifying the correlations comprises determining a prior user interaction with the displayed page that resulted in a viewing of the page determined to be the anticipated next page.

6. The method of claim 1, wherein identifying the correlations comprises identifying a link from the first page to the page determined to be the anticipated next page.

7. The method of claim 1, wherein identifying the correlations comprises identifying text threaded from a container in the first page to a container in the page determined to be the anticipated next page.

8. The method of claim 1, wherein identifying the correlations comprises identifying text threaded from a container in the first page to a container in the page determined to be the anticipated next page.

9. A computerized device comprising:
a memory;
a processor;
a communications interface;
an interconnection mechanism coupling the memory, the processor and the communications interface;

wherein the memory is encoded with a predictive document rendering application that when executed on the processor reduces the wait time for the rendering of pages within portable documents on the computerized device by performing the operations of:

receiving a page of a document having a predefined format to be rendered on the computerized device, the document comprising a plurality of pages;

identifying correlations between the page and each of a plurality of other pages of the document, the correlations identified based on multiple criteria comprising criteria regarding page links, page sequence, page attributes, page view history, or user-assigned importance, the plurality of other pages comprising one or more pages not sequential to the displayed page;

assigning a weight to each correlation indicating a relative importance of the correlation between the first page and the respective other page; and determining an anticipated next page of the plurality of other pages based on the weights.

10. The system of claim 9, wherein identifying the correlations comprises determining a prior user interaction with the displayed page that resulted in a viewing of the page determined to be the anticipated next page.

11. The system of claim 9, wherein identifying the correlations comprises identifying a link from the first page to the page determined to be the anticipated next page.

12. A computer program product comprising a non-transitory computer readable medium embodying program code, the program code comprising:

program code for displaying a page of a document comprising a plurality of pages;

program code for identifying correlations between the displayed page and each of a plurality of other pages of the document, the correlations identified based on two or more of the following criteria:
page links,
page sequence,
page attributes,
page view history,
user-assigned importance,
threaded text within the document,
a bookmark within the document,
comments within the document,
font size of text,
formatting of text,
multimedia within the document,
most viewed pages of the document,
highlighted text, and
time a user has spent on a page of the document;

program code for assigning a weight to each correlation indicating a relative importance of the correlation between the displayed page and the respective other page; and program code for determining an anticipated next page of the plurality of other pages according to the weights.

13. The computer program product of claim 12, wherein the program code for identifying at least one correlation takes into account data indicating a prior user interaction with the displayed page.

14. The computer program product of claim 12, wherein the program code for identifying at least one correlation takes into account data indicating a prior user interaction with the anticipated next page.

15. The computer program product of claim 12, wherein the program code for identifying at least one correlation comprises program code for determining a predictive sequence of pages.

16. The computer program product of claim 12, further comprising program code for downloading the anticipated next page.

17. The computer program product of claim 12, further comprising:

program code for displaying another page and, in response to displaying, determining a new anticipated next page.

\* \* \* \* \*